Patented Feb. 19, 1952

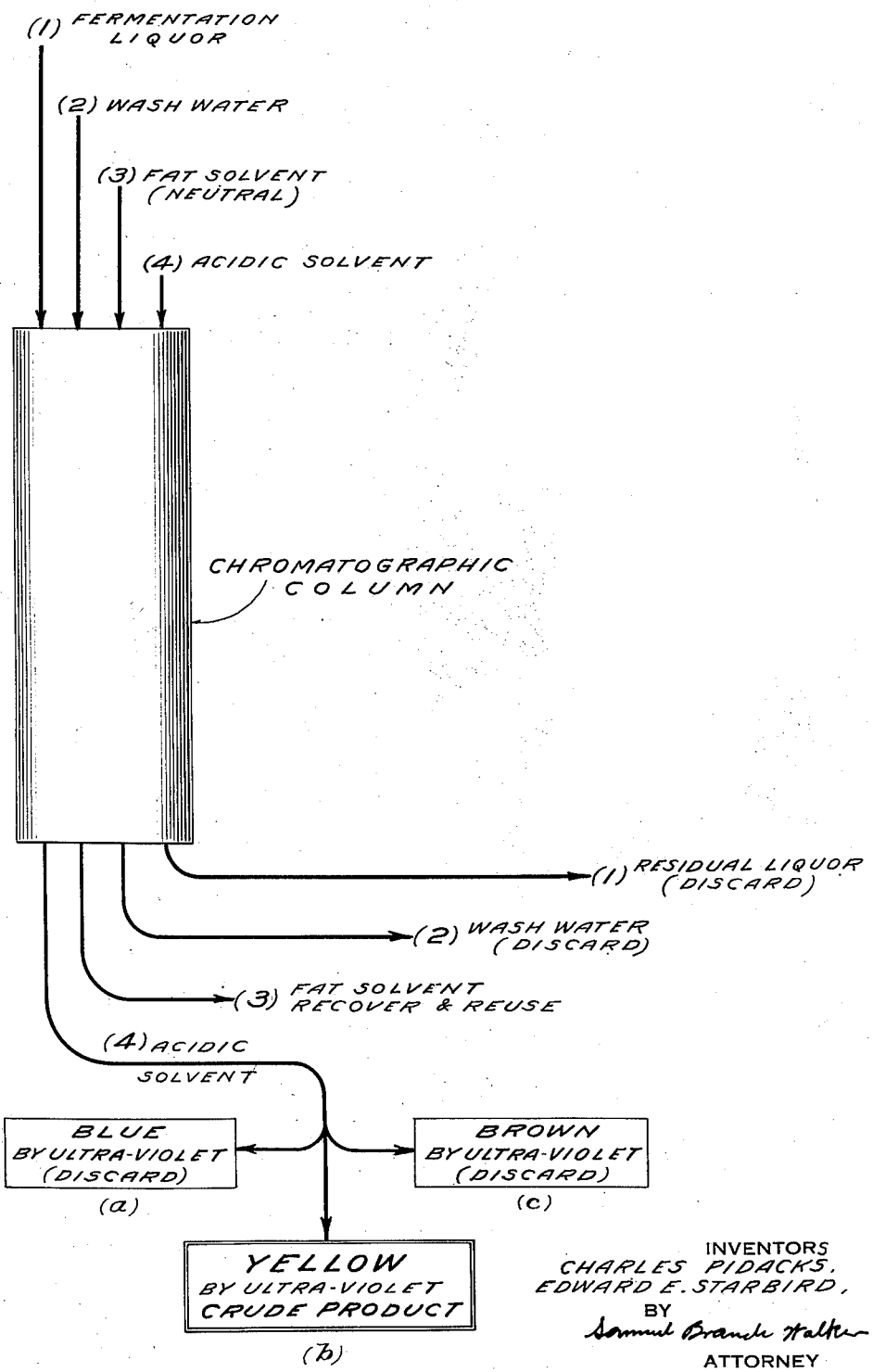

2,586,766

UNITED STATES PATENT OFFICE 2,586,766

PURIFYING AUREOMYCIN BY CHROMATOGRAPHIC ADSORPTION

Charles Pidacks, Spring Valley, and Edward E. Starbird, Nanuet, N. Y., assignors to American Cyanamid Company, New York, N. Y., a corporation of Maine Application November 30, 1948, Serial No. 62,765

22 Claims. (Cl. 167—65)

This invention relates to the purification of aureomycin and has for its object a new and novel process for the extraction of aureomycin from its fermentation media, and its purification.

Within the recent past, it has been found that the organism known as *Streptomyces aureofaciens* during its growth produces a substance now characterized as aureomycin and which substance is a useful and extremely potent therapeutic agent which possesses a class of utility not possessed by any previously described therapeutic agent, particularly in its utility against certain bacteria of the gram negative group and rickettsial organisms.

The antibiotic, a method of fermentation, and characteristics of each are set forth in greater detail in an application of Benjamin M. Duggar, Serial Number 7,592, filed February 11, 1948, now Patent No. 2,482,055, dated September 13, 1949.

Additionally, the organism, methods of its cultivation and certain of the properties of aureomycin have been disclosed in meetings of the New York Academy of Sciences and are published in the Annals of the New York Academy of Sciences, vol. 51, article II, November 1948.

The pure aureomycin appears to be an amphoteric material exhibiting both acid and basic characteristics, and for therapeutic purposes, either the acidic or basic salts may be used as well as a free material.

For many purposes the hydrochloride is particularly convenient from the therapeutic standpoint. From the aureomycin isolated by the method of this invention, it is readily possible to convert to the acidic addition salt, to the basic addition salt or to the free neutral material as may be desired.

Our invention comprises more particularly a method of chromatographic adsorption followed by a development of the chromatogram, including elution and isolation of a material.

Other objects and advantages will appear in the accompanying description and drawing.

The drawing shows diagrammatically the flow sheet of the chromatographic purification procedure.

The fermented mash containing the aureomycin may be harvested by removing the mycelia and other insoluble growths produced, by filtration. The clear solution may then be adsorbed completely upon various active materials such as aluminum oxide, magnesium oxide, charcoal or diatomaceous earth. Certain trade names for specific grades which have been found useful are Florisil, Super-Filtrol, Nuchar, Darco-G-60, and others. The clear filtrate after passing through the adsorption material may be discarded and the column washed with water to remove the residual mash and other impurities. The column may then be washed with a suitable fat solvent such as acetone which removes most of the fatty material which might otherwise interfere, and a considerable quantity of the colored impurities. Other fat solvents such as methanol or ethanol, chloroform, etc. are suitable. The solvent is preferably somewhat water soluble. The solvent in the wash may be recovered and reused; and the water wash is discarded. The column then contains the active material, aureomycin, together with certain impurities. Because of the difficulty of determining where the active ingredient lies by ordinary light, the column is developed under illumination by ultraviolet light. An acid alcohol wash may be used for the development, mineral acids such as hydrochloric or sulfuric in methyl alcohol are particularly suitable although the other alcohols including ethyl, the butyls, the propyls or higher alcohols or acetone and higher ketones, methyl Cellosolve, and the higher Cellosolves may be used if the pH of the solvent is held below 5.0 with an acid. The pH of the wash used for elution may be as low as about 1, but more satisfactory separations are obtained if the eluant is less acid than a pH of about 1. The first band which is removed from the column is blue by ultraviolet light and contains little activity and may be discarded. The second band is a brilliant yellow, and contains the bulk of the activity. The third band is a dull brown and contains a small amount of the activity but normally so small that its subsequent treatment is not economically justified, although the material may readily be recovered if desired. The eluate containing the material in the brilliant yellow band is concentrated to dryness in vacuo, and the dry product extracted with n-butyl alcohol, the n-butyl alcohol containing all of the activity. The n-butyl alcohol extract is water washed, with small quantities of water and the butanol phase containing the activity is concentrated in vacuo to a small volume from which the active material may be precipitated by the addition of absolute ether. The material may be precipitated stepwise. The precipitate is washed with ether and dried. The dried product may be then dissolved in water, acidified with hydrochloric acid to a pH of 2 to 3, frozen and the water removed by sublimation. The dried product thus obtained has a biological potency of 2900 units per mg. when tested by the standard test for penicillin G against *Staphylococcus aureus*.

The active material may be salted into various solvents using such salts as ammonium sulfate or sodium chloride including such esters as methyl acetate, ethyl acetate, amyl acetate, etc.; alcohols such as isopropyl, butyl, etc. and acetone or other ketone. If the active material is extracted by the above solvents without the use of a salt, it results in a much lower yield and further, certain of those solvents are miscible with water unless the salt is added. Under any conditions the use of salt decreases the solubility of the solvent and the aureomycin in the water.

EXAMPLE 1

Fermentation of aureomycin

The fermentation media was prepared containing by weight:

1% corn steep liquor (50% solids)
1% sucrose
0.2% $(NH_4)_2HPO_4$
0.2% $KH_2PO_4$
0.025% $Mg.SO_4.7H_2O$
0.1% $CaCO_3$ Sufficient manganese, copper and zinc were introduced to insure that the amounts present both as impurities in the other material and by addition were at least approximately 0.00033% manganese as $MnCl_2.4H_2O$; 0.00033% copper as $CuSO_4.5H_2O$; and 0.005% zinc as $ZnSO_4.7H_2O$. The medium was sterilized with steam for approximately 20 minutes at approximately 120° C. The natural unadjusted pH of the medium was 6.2–6.4 before sterilization and 6.0–6.1 after sterilized. During the normal fermentation the pH drops to approximately 4.5 to 4.8.

The tank is inoculated with spores from an agar slant of *Streptomyces aureofaciens*, an inoculum of approximately 0.5% by volume being used, the inoculation of course being made aseptically. The amount of inoculum may be varied and a larger amount will decrease the necessary time of fermentation. The fermentation is conducted with agitation or aeration. In large tanks the necessary degree of aeration is more readily accomplished by introduction of air than by the mere use of an agitator. The rate of air flow may be from about 0.2 to 3.0 liters of air per liter of mash per minute, the preferred rate being in the neighborhood of 1 liter of air per liter of mash per minute. Excessive foaming may be controlled by agents such as a higher alcohol or hydrocarbon oil or mixtures thereof, as for example, a 1% solution of octadecanol in lard oil, the sterile anti-foam agent being added aseptically as needed. The fermentation is best conducted at a temperature range of 26–28° C. under positive pressure in the tank to reduce danger of contamination for a period of 24–28 hours. At the end of this time fermentation liquor is withdrawn and treated to recover the aureomycin.

EXAMPLE 2

The mash obtained by the above fermentation was stirred with 10 grams per liter of the filter aid sold commercially as Super Cel, and the mash filtered. Forty-one liters of clear filtrate at a pH of 4.65 was adsorbed on a glass column 85 centimeters long by 6½ centimeters inside diameter, containing 1025.5 grams of Florisil, a 60–100 mesh product being used. Florisil appears to be a treated clay or fuller's-earth type of adsorbent, consisting predominantly of magnesium silicate with smaller amounts of aluminum, calcium, potassium, iron, copper and phosphorus as combined oxides. (Diatomaceous earths may be used under similar conditions.) The column was washed with 9 liters of water followed by 2 liters of acetone. Both washes were heavily colored and were discarded, as was the filtrate. Thirty-one liters of methanol containing 10 cc. of concentrated hydrochloric acid per liter were used to develop the column. The column was developed while being observed by ultraviolet light and three characteristic bands which were formed were removed from the column as separately as feasible. The total recovery on the column was as set forth in the following table:

ASSAY RESULTS OF COLUMN

[*Staphylococcus aureus* used as the assay organism.]

| | Vol. l. | Potency, u./cc. | pH | Total Units in M | Percent |
|---|---|---|---|---|---|
| Mash | 41.0 | 150 | 4.65 | 6.15 | |
| Adsorption filtrate: | | | | | |
| (1) | 9.0 | 0 | 8.8 | 0 | |
| (2) | 9.0 | 0 | 8.7 | 0 | |
| (3) | 9.0 | 0 | 8.2 | 0 | |
| (4) | 9.0 | 0 | 7.4 | 0 | |
| (5) | 5.0 | 0 | 7.25 | 0 | |
| Water wash | 9.0 | 0 | 7.8 | 0 | |
| Acetone wash | 2.0 | 0 | 6.9 | 0 | |
| Acid alcohol bands: | | | | | |
| (1) Blue | .47 | 264 | 7.15 | 0.124 | 2.01 |
| (2) Yellow *a* | 7.5 | 650 | 2.85 | 4.875 | 79.2 |
| Yellow *b* | 9.0 | 103 | 1.75 | 0.927 | 15.07 |
| (3) Brown | 14.0 | 25 | 2.80 | .350 | 5.6 |
| Total | | | | 6.276 | 101.88 |

Two liters of the extract from the "yellow bands" were concentrated to dryness in vacuo and the dried product extracted several times with small volumes of normal butyl alcohol and filtered free from a considerable amount of butanol-insoluble material. The combined butanol extracts, totaling 325 ml., were washed with small quantities of water and the water washed butanol concentrated by evaporation under partial vacuum to 50 ml. Acetone was added to the concentrated butanol until a brown colored precipitate resulted and the precipitate removed and the solution again precipitated, this time with absolute ether. The ether precipitate was ether washed, dried, dissolved in acid water, frozen and dried with the following results:

ASSAY RESULTS

ASSAY RESULTS

| | Vol. | Potency u./cc. | Total units | Per Cent | u./mg. |
|---|---|---|---|---|---|
| Yellow band | 2,000 ml. | 1,605 | 3,210,000 | | |
| Butanol extract | 325 ml. | 8,000 | 2,600,000 | 81 | |
| Water washed Butanol | 322 ml. | 6,400 | 2,060,800 | 62.5 | |
| Acetone precipitate | 50 mg. | | 31,500 | 1 | 630 |
| Ether ppt. #1 | 245 mg. | | 166,600 | 5.17 | 680 |
| Ether ppt. #2 | 175 mg. | | 113,750 | 3.54 | 650 |
| Mother liquor dried | 615 mg. | | 876,375 | 27.3 | 1,425 |
| Dry material | | | 1,188,225 | 37.01 | |

The exact quantities as shown in the examples are of course not critical, and may be varied, with corresponding variations in yields in the respective steps.

Having thus set forth and described certain embodiments thereof, as our invention we claim:

1. In the process of purifying aureomycin, the steps which comprise adsorbing the aureomycin from an aqueous solution containing aureomycin onto an adsorbent and eluting the aureomycin with an acidulated organic solvent, selecting the fraction which appears yellow under ultraviolet light, and recovering aureomycin therefrom.

2. In the process of purifying aureomycin, the steps which comprise adsorbing the aureomycin from an aqueous solution containing aureomycin onto activated carbon and eluting the aureomycin from the activated carbon with an acidulated organic solvent, selecting the portion thereof which appears yellow under ultraviolet light, and recovering the aureomycin therefrom.

3. In the process of purifying aureomycin, the steps which comprise adsorbing the aureomycin from an aqueous solution containing aureomycin onto diatomaceous earth and eluting the aureomycin from the diatomaceous earth with an acidulated organic solvent, selecting the portion thereof which appears yellow under ultraviolet light, and recovering the aureomycin therefrom.

4. In the process of purifying aureomycin, the steps which comprise adsorbing the aureomycin from an aqueous solution containing aureomycin onto aluminum oxide and eluting the aureomycin from the aluminum oxide with an acidulated organic solvent, selecting the portion thereof which appears yellow under ultraviolet light, and recovering the aureomycin therefrom.

5. In the process of purifying aureomycin, the steps which comprise adsorbing the aureomycin from an aqueous solution containing aureomycin onto magnesium silicate and eluting the aureomycin from the magnesium silicate with an acidulated organic solvent, selecting the portion thereof which appears yellow under ultraviolet light, and recovering the aureomycin therefrom.

6. In the process of purifying aureomycin, the steps which comprise adsorbing the aureomycin from an aqueous solution containing aureomycin onto magnesium oxide and eluting the aureomycin from the magnesium oxide with an acidulated organic solvent, selecting the portion thereof which appears yellow under ultraviolet light, and recovering the aureomycin therefrom.

7. In the process of purifying aureomycin, the steps which comprise chromatographically adsorbing the aureomycin from an aqueous solution containing aureomycin onto an adsorbent, washing the chromatogram with an acidulated methanol, selecting the fraction which appears yellow under ultraviolet light, and recovering the aureomycin therefrom.

8. In the process of purifying aureomycin, the steps which comprise chromatographically adsorbing the aureomycin from an aqueous solution containing aureomycin onto an adsorbent, washing the chromatogram with an acidulated ethanol, selecting the fraction which appears yellow under ultraviolet light, and recovering the aureomycin therefrom.

9. In the process of purifying aureomycin, the steps which comprise chromatographically adsorbing the aureomycin from an aqueous solution containing aureomycin onto an adsorbent, washing the chromatogram with an acidulated acetone, selecting the fraction which appears yellow under ultraviolet light, and recovering the aureomycin therefrom.

10. The method according to claim 1 in which the aqueous solution is an aureomycin-containing fermentation liquor.

11. The method according to claim 2 in which the aqueous solution is an aureomycin-containing fermentation liquor.

12. The method according to claim 3 in which the aqueous solution is an aureomycin-containing fermentation liquor.

13. The method according to claim 4 in which the aqueous solution is an aureomycin-containing fermentation liquor.

14. The method according to claim 5 in which the aqueous solution is an aureomycin-containing fermentation liquor.

15. The method according to claim 6 in which the aqueous solution is an aureomycin-containing fermentation liquor.

16. The method according to claim 7 in which the aqueous solution is an aureomycin-containing fermentation liquor.

17. The method according to claim 8 in which the aqueous solution is an aureomycin-containing fermentation liquor.

18. The method according to claim 9 in which the aqueous solution is an aureomycin-containing fermentation liquor.

19. The method of recovering aureomycin from aqueous fermentation liquor comprising adsorbing the aureomycin from the filtered fermentation liquor onto a chormatographic adsorbent, eluting the aureomycin by means of an acidulated organic solvent, selecting the portion which appears yellow under ultraviolet light, concentrating this fraction to dryness, extracting with n-butyl alcohol, concentrating the extract and precipitating the aureomycin therefrom by the addition of absolute ether, washing the thus obtained aureomycin, acidifying with hydrochloric acid to a pH of between about 2 and about 3, freezing, and removing the water by sublimation, thereby recovering aureomycin as the hydrochloride.

20. A method of recovering aureomycin from an aqueous liquor containing the same, which comprises adsorbing the aureomycin onto a chromatographic adsorbent selected from the group consisting of activated carbon, diatomaceous earth, aluminum oxide, magnesium oxide, and magnesium silicate, washing with acetone, washing with acidulated methanol, selecting the portion of the acidulated methanol which appears yellow under ultraviolet light, concentrating the selected fraction to dryness, extracting the dried fraction with butanol, concentrating the extract, and precipitating the aureomycin therefrom by the addition of absolute ether, separating the precipitated aureomycin, dissolving in water acidulated with hydrochloric acid, freezing, and removing the water therefrom by sublimation, thereby recovering aureomycin as the hydrochloride.

21. A method of recovering aureomycin from an aqueous liquor containing the same, which comprises adsorbing the aureomycin onto diatomaceous earth, washing with acetone, eluting the aureomycin with acidulated methanol, selecting the portion of the acidulated methanol which appears yellow under ultraviolet light, concentrating the selected fraction to dryness, extracting the dried fraction with butanol, concentrating the extract, and precipitating the aureomycin therefrom by the addition of absolute ether, separating the precipitated aureomycin, dissolving in water acidulated with hydrochloric acid, freezing, and removing the water therefrom by sublimation, thereby recovering aureomycin as the hydrochloride.

22. A method of recovering aureomycin from an aqueous liquor containing the same, which comprises adsorbing the aureomycin onto a magnesium silicate, washing with acetone, eluting the aureomycin with acidulated methanol, selecting the portion of the acidulated methanol which appears yellow under ultraviolet light, concentrating the selected fraction to dryness, extracting the dried fraction with butanol, concentrating the extract, and precipitating the aureomycin therefrom by the addition of absolute ether, separating the precipitated aureomycin, dissolving in water acidulated with hydrochloric acid, freezing, and removing the water therefrom by sublimation, thereby recovering aureomycin as the hydrochloride.

CHARLES PIDACKS.
EDWARD E. STARBIRD.

REFERENCES CITED

The following references are of record in the file of this patent:

UNITED STATES PATENTS

| Number | Name | Date |
| --- | --- | --- |
| 2,482,055 | Duggar | Sept. 13, 1949 |

OTHER REFERENCES

Quarendon: Mfg. Chem., vol. 14, pp. 251–254 (1943).

Peck et al.: J. Am. Chem. Soc., vol. 68, pp. 772–776 (1946).

Kochalty et al.: J. Biol. Chem., vol. 168, pp. 765, 769 (May 1947).

Ehrlich et al.: Sci., vol. 106, pp. 417–419 (October 31, 1947).

Heatley et al.: Brit. J. Exptl. Path., vol. 28, pp. 35–46 (1947).